United States Patent
Richter et al.

(10) Patent No.: US 11,306,596 B2
(45) Date of Patent: Apr. 19, 2022

(54) GAS TURBINE BLADE IMPULSE BODY MODULE

(71) Applicant: MTU Aero Engines AG, Munich (DE)

(72) Inventors: Karl-Hermann Richter, Markt Indersdorf (DE); Herbert Hanrieder, Hohenkammer (DE); Steffen Gerloff, Karlsfeld (DE)

(73) Assignee: MTU Aero Engines AG, Munich (DE)

( * ) Notice: Subject to any disclaimer, the term of this patent is extended or adjusted under 35 U.S.C. 154(b) by 75 days.

(21) Appl. No.: 16/712,513

(22) Filed: Dec. 12, 2019

(65) Prior Publication Data
US 2020/0190986 A1   Jun. 18, 2020

(30) Foreign Application Priority Data
Dec. 13, 2018   (DE) ............... 10 2018 221 668.1

(51) Int. Cl.
*F01D 5/16*   (2006.01)
*F01D 5/26*   (2006.01)
(Continued)

(52) U.S. Cl.
CPC .............. *F01D 5/16* (2013.01); *F01D 5/26* (2013.01); *B23K 2101/001* (2018.08);
(Continued)

(58) Field of Classification Search
CPC ... F01D 5/10; F01D 5/14; F01D 5/147; F01D 5/16; F01D 5/26; F01D 25/04;
(Continued)

(56) References Cited

U.S. PATENT DOCUMENTS

| 2,999,669 A | 9/1961 | McGinnis |
| 6,554,112 B2 * | 4/2003 | Kato ................. F16F 7/10 |
| | | 188/378 |

(Continued)

FOREIGN PATENT DOCUMENTS

| DE | 10 2016 205 995 A1 | 10/2017 |
| DE | 10 2016 211 068 A1 | 12/2017 |

(Continued)

OTHER PUBLICATIONS http://www.ashfield-extrusion.co.uk/german; Captured Dec. 17, 2017; Ashfield Extrusion Limited; Extruded Aluminum Parts.

*Primary Examiner* — Woody A Lee, Jr.
*Assistant Examiner* — Elton K Wong
(74) *Attorney, Agent, or Firm* — Barlow, Josephs & Holmes, Ltd.; David R. Josephs

(57) ABSTRACT

The present invention relates to an impulse body module group with at least two impulse body modules, which, in particular, are identical in construction, for a gas turbine blade, wherein each of the impulse body modules comprises a housing, which, in particular, is of one piece and which has a first cavity, which is closed, in particular in an airtight manner, by a first cover, which is joined to the housing, in particular in a material-bonded manner, and in which a single, in particular spherical or cylindrical, first impulse body is accommodated with play of movement in at least one first direction of impact, wherein the housing has no additional cavity or a single additional cavity, in which a single, in particular spherical or cylindrical, additional impulse body is accommodated with play of movement in at least one direction of impact.

12 Claims, 4 Drawing Sheets

(51) Int. Cl.
*B23K 101/00* (2006.01)
*F01D 5/14* (2006.01)
*F01D 9/04* (2006.01)

(52) U.S. Cl.
CPC .............. *F01D 5/147* (2013.01); *F01D 9/041* (2013.01); *F05D 2230/238* (2013.01); *F05D 2250/241* (2013.01); *F05D 2260/96* (2013.01)

(58) Field of Classification Search
CPC . F01D 25/06; F01D 9/04; F01D 9/041; F01D 9/042; F05D 2260/96; F05D 2260/961; F05D 2230/238; F05D 2250/241; F04D 29/666; F04D 29/668
See application file for complete search history.

(56) References Cited

U.S. PATENT DOCUMENTS

| | | | |
|---|---|---|---|
| 6,827,551 | B1 | 12/2004 | Duffy et al. |
| 2016/0146041 | A1* | 5/2016 | Hartung ................. F01D 25/06 |
| | | | 415/119 |
| 2016/0333710 | A1* | 11/2016 | Klinetob ................... F01D 5/16 |
| 2017/0204740 | A1* | 7/2017 | Schlemmer ............... F01D 5/30 |
| 2017/0335695 | A1* | 11/2017 | Schlemmer ............... F01D 5/26 |

FOREIGN PATENT DOCUMENTS

| | | | |
|---|---|---|---|
| DE | 10 2016 214 234 | A1 | 2/2018 |
| EP | 2484870 | A1 | 8/2012 |
| EP | 3020922 | A1 | 5/2016 |
| EP | 3023584 | A1 | 5/2016 |
| EP | 3138996 | A1 | 3/2017 |
| EP | 3196413 | A1 | 7/2017 |
| EP | 3219916 | A1 | 9/2017 |
| EP | 3219917 | A1 | 9/2017 |
| EP | 3239461 | A1 | 11/2017 |
| EP | 3241995 | A1 | 11/2017 |
| EP | 3244008 | A1 | 11/2017 |
| EP | 3315718 | A1 | 5/2018 |
| WO | 2012095067 | A1 | 7/2012 |
| WO | 2017220058 | A1 | 12/2017 |

* cited by examiner

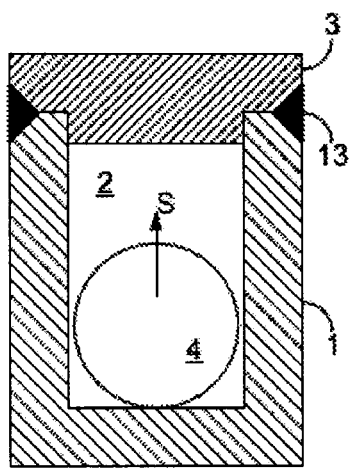
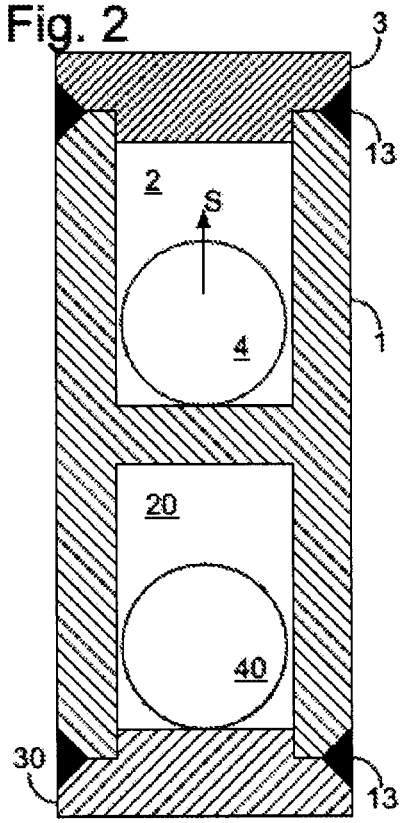
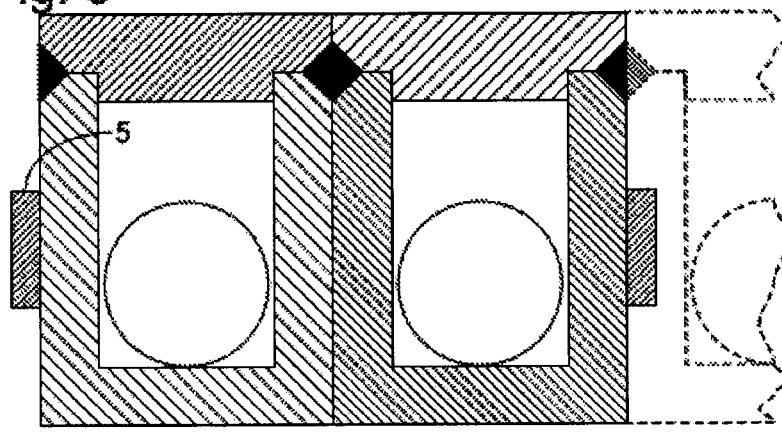

GAS TURBINE BLADE IMPULSE BODY MODULE

BACKGROUND OF THE INVENTION

The present invention relates to an impulse body module for a gas turbine blade, an impulse body module group, a gas turbine blade, and an impulse body module group assembly having the impulse body module groups, a method for producing the impulse body module or the impulse body module group assembly, and the use thereof.

Known particularly from our own EP 3 219 916 A1 are carton-like impulse detuning components, the housings of which have a plurality of cavities, in each of which impulse bodies are arranged in order to reduce vibrations of gas turbine blades. This is based, in particular, on a proposed concept for reducing vibrations through impact contacts between the impulse bodies and the cavities, which is disclosed in our own WO 2012/095067 A1, to which reference is made supplementally and the content of which is included to the full extent in the present disclosure.

However, these egg-carton-like impulse detuning components are costly in terms of production and relatively large in construction, and each must be produced in a specific manner, depending on the desired number of impulse bodies.

SUMMARY OF THE INVENTION

An object of one embodiment of the present invention is to improve a reduction of vibrations of gas turbine blades by means of impact contacts between impulse bodies and cavities and/or to reduce one or more of the aforementioned drawbacks, in particular to improve the production of generic or functionally equivalent impulse detuning components.

This object is achieved by an impulse body module group of the present invention. The present invention provides an impulse body module group assembly having, in each case, at least two of the impulse body modules described here, a gas turbine blade with at least one impulse body module group described here, a method for producing one of the impulse body modules or impulse body module groups described here and for producing a gas turbine blade or an impulse body module group assembly described here, and a use of an impulse body module group described here or of an impulse body module group assembly described here. Advantageous embodiments of the invention are discussed in detail below.

In accordance with one embodiment of the present invention, an impulse or tuning body module for a gas turbine blade or of a gas turbine blade has a housing, which, in one embodiment, is of one piece or is produced in one piece and which has a cavity, which, in the present case, without loss of generality, is referred to as first cavity and which is or will be closed, in one embodiment in an airtight manner, by a first cover that is joined in a material-bonded manner and in which a single impulse body or (de)tuning body, which, in one embodiment, is spherical or cylindrical in shape and, in the present case, correspondingly, without loss of generality, is referred to as first impulse body, is accommodated with play of movement in at least one direction of impact, which, in the present case, correspondingly is referred to, without loss of generality, as first direction of impact.

In accordance with one embodiment of the present invention, the housing has no additional cavity in which a single additional impulse body is accommodated with play of movement in at least one direction of impact, wherein, in one embodiment, an angle between this direction of impact and the first direction of impact is at most 45°, in particular at most 15°, and, in one embodiment, at most 5°, it being possible for said direction of impact to be, in particular, the same as the first direction of impact.

In accordance with another embodiment of the present invention, the housing has (only) a single additional cavity in which a single additional impulse body, which, in one embodiment, can be spherical or cylindrical in shape, is accommodated with play of movement in at least one direction of impact, wherein, in one embodiment, an angle between this direction of impact and the first direction of impact is at most 45°, in particular at most 15°, and, in one embodiment, at most 5°, it being possible for said direction of impact to be, in particular, the same as the first direction of impact.

In one embodiment, the additional cavity is or will be closed by an additional cover, which, in one embodiment, is joined to the housing in a material-bonded manner and, in one embodiment, in an airtight manner, and, in particular, lies opposite the first cover, in particular (as viewed) in the first direction of impact.

Therefore, in accordance with one embodiment of the present invention, an impulse body module having exactly one cavity or exactly two cavities, in which or in each of which a single impulse body is accommodated, is made available.

In one embodiment, it is thereby possible, in particular in comparison to the egg-carton-like impulse detuning component of EP 3 219 916 A1, to reduce the cost of production.

In one embodiment, the first and/or additional cover will be or is joined by means of welding, in particular, in one embodiment, by beam welding, in particular laser beam welding or electron beam welding, as a result of which, in one embodiment, an especially advantageous, in particular airtight and/or reliable, material-bonded connection can be realized.

Through the airtight closure of the cavity (cavities), it is advantageously possible to protect the (respective) impulse body, and, in particular, to reduce any oxidation and/or corrosion of the impulse body and/or the cavity, and/or to dispense with a sealing of a cavity of the gas turbine blade in which the impulse body module is arranged—which is more costly by comparison.

In one embodiment, the housing has at least one, in particular at least two, in one embodiment at least three and/or at most three, symmetry plane or planes, particularly placed vertically one above the other, and/or is cylindrical or cuboid in shape, in one embodiment, cube-shaped, in particular with rounded edges. Additionally or alternatively, in one embodiment, the first cavity has at least one, in particular at least two, in one embodiment at least three and/or at most three, symmetry plane or planes, in particular placed vertically one above the other, and/or (a) rounded or chamfered inner contour(s) and/or is cylindrical or cuboid in shape, in one embodiment cube-shaped, in particular with rounded edges. Additionally or alternatively, in one embodiment, the additional cavity has at least one, in particular at least two, in one embodiment at least three and/or at most three, symmetry plane or planes, in particular placed vertically one above the other, and/or (a) rounded or chamfered inner contour(s) and/or is cylindrical or cuboid in shape, in one embodiment cube-shaped, in particular with rounded edges.

In this way, in one embodiment, in each case, and particularly in combination, the fabrication of the housing and/or the consolidation thereof with one additional impulse body module or with a plurality of additional impulse body modules according to the invention and/or its arrangement at or in the gas turbine blade and/or the impact contact characteristic can be improved.

In one embodiment, the first cover and/or the additional cover is or are centered in a form-fitting manner at the housing; for this purpose, in one embodiment, the cover has a flange, which engages in the cavity.

In this way, in one embodiment, it is possible to improve the production, in particular the sealing, of the impulse body module.

In an alternative embodiment, the first cover and/or the additional cover rests or rest flat on the housing or without form fit.

In this way, in one embodiment, the production of the cover can be improved.

In one embodiment, a wall thickness of the first cavity and/or a wall thickness of the additional cavity of the housing varies or vary (in each case) by at most 25%, in one embodiment by at most 10%, in particular along the respective or first direction of impact.

In this way, in one embodiment, it is possible to improve the production of the housing and/or to improve the impact contact characteristic of the impulse body module.

Additionally or alternatively, in one embodiment, a wall thickness of the first cavity, in particular a maximum, minimum, or mean wall thickness of the first cavity, and/or a wall thickness of the additional cavity, in particular a maximum, minimum, or mean wall thickness the additional cavity, is (in each case) at least 1%, in particular at least 2%, in one embodiment at least 5% and/or at most 50%, in particular at most 25%, in one embodiment at most 10%, of a diameter, in particular a maximum, minimum, or mean diameter of the impulse body accommodated in the cavity.

In this way, in one embodiment, it is possible to improve (further) the impact contact characteristic of the impulse body module.

Additionally or alternatively, in one embodiment, a play of movement of the first impulse body in the first cavity, in particular a maximum, minimum, or mean play of movement of the first impulse body in the first cavity, and/or a play of movement of the additional impulse body in the additional cavity, in particular a maximum, minimum, or mean play of movement of the additional impulse body in the additional cavity, in the (respective) direction of impact is at least 1%, in particular at least 2%, in one embodiment at least 5% and/or at most 500%, in particular at most 200%, in one embodiment at most 100%, in particular at most 50%, of the diameter of this impulse body, in particular the maximum, minimum, or mean diameter of this impulse body and/or at least two times, in particular at least four times, in one embodiment at least ten times and/or at most one-hundred times, in particular at most fifty times, in one embodiment at most twenty times, a play of movement in a guiding direction transverse to this direction of impact.

In this way, in one embodiment, it is possible to improve (further) the impact contact characteristic of the impulse body module.

As already mentioned, it is possible by means of the impulse body modules described here to make available (advantageously) advantageous subunits, which, depending on the installation space and/or the requirement, in particular in order to reduce vibrational modes, can be assembled together to form different impulse body module groups.

Correspondingly, in accordance with one embodiment of the present invention, an impulse body module group has two or more impulse body modules described here, which, in one embodiment, are identical in construction and which are or will be joined to one another in a non-destructive detachable manner or in a permanent manner or in an at least only partially destructive detachable manner. In one embodiment, these impulse body modules are or will be joined to one another in a friction-fitting manner, in particular by clamping, in a form-fitting manner, in particular by means of one projection or a plurality of projections, in one embodiment swallowtail-like projections, at least at one of the two impulse body modules, which engage in recesses at the other impulse body module, and/or in a material-bonded manner, in particular by welding, soldering, and/or adhesive bonding, in particular metal-to-metal adhesive bonding, and/or by means of one or more clamping elements. In one embodiment, these impulse body modules are or will be arranged one above the other in the first direction of impact or next to one another transverse to the first direction of impact.

In one embodiment, it is thereby possible to improve the handling and/or fastening and/or to improve (further) the impact contact characteristic of the impulse body modules.

In accordance with one embodiment of the present invention, the impulse body modules of the impulse body module group are arranged in an L shape, in a C shape, in a ring shape, in particular a rectangular and/or square ring shape, or in a shape that is formed from two or more suchlike shapes.

These shapes offer advantages for certain, respective vibrational characteristics at the position of placement, in particular for different resonances and/or rotational speeds.

The L shape is advantageous for use at places at which there is insufficient space for the known, integral box arrangement.

The C shape and ring shape offer advantages for fastening and, in particular in the case of an accommodation without material-bonded fit, can make possible a fixation or anchoring even at standstill during which there is no fixation due to centrifugal force.

In accordance with one embodiment of the present invention, an impulse body module group assembly has a first impulse body module group or a plurality of first impulse body module groups, as described here, and a second impulse body module group or a plurality of second impulse body module groups, as described here, wherein the first impulse body module group or the first impulse body module groups has or each have a first number of impulse body modules described here, which, in one embodiment, are identical in construction, and the second impulse body module group or the second impulse body module groups has or each have a second number of impulse body modules described here, which, in one embodiment, are identical in construction to one another and/or are identical in construction to impulse body modules of the first impulse body module groups and, in particular, are composed thereof, wherein the first number and second number are different from each other.

As already mentioned, in one embodiment, it is possible to assemble together the impulse body modules as subunits, depending on the installation space and/or the requirement, in particular, to reduce vibrational modes, to form different impulse body module groups and thus to make available, with low production cost, different numbers of tuning bodies or different structural sizes.

In accordance with one embodiment of the present invention, a gas turbine blade, in one embodiment a turbine or compressor rotating blade, has at least one impulse body module described here or at least one impulse body module group described here, which, in one embodiment, is or will be arranged at, in particular at least partially in, an outer shroud or inner shroud, and, in one embodiment, in a cavity of the gas turbine blade.

In one embodiment, the impulse body module or the impulse body module group is fastened in a friction-fitting manner, in a form-fitting manner, and/or in a material-bonded manner and/or by means of at least one fastening element, in particular by means of the at least one clamping element with which the impulse body modules of the impulse body module group are joined together or else by means of a locking plate, which, for this purpose, is pre-bent in one embodiment and/or is or will be fastened to the gas turbine blade in a material-bonded manner, in particular by spot welding.

In this way, in one embodiment, it is possible to improve (further) the handling and/or fastening and/or to improve the impact contact characteristic of the impulse body modules.

In one embodiment, the cavity of the gas turbine blade, together with the impulse body module or impulse body module group arranged in it, is or will be closed by a sealing cover, which, in an enhancement, is or will be welded, soldered, and/or adhesively bonded to the gas turbine blade.

In this way, in one embodiment, it is possible to improve (further) the handling and/or fastening.

Additionally or alternatively, in one embodiment, the impulse body module or the impulse body module group is arranged with or without play in the cavity of the gas turbine blade. Through an arrangement with play, it is possible in one embodiment to improve (further) the impact contact characteristic; through a play-free arrangement, it is possible in one embodiment to (further) improve reliability.

In one embodiment, the first cavity and/or the additional cavity are or will be or is or will be produced (in each case) by means of material removal, in particular machining and/or electrical material removal, in one embodiment by means of lathing, milling, electrochemical machining (ECM), or electrodischarge machining (sinking EDM).

In one embodiment, the first cavity and/or the additional cavity are or will be or is or will be produced (in each case) by means of primary shaping, in particular extrusion, in one embodiment cold extrusion, semi-hot extrusion, or hot extrusion; in one embodiment, the first cavity and the additional cavity are will undergo jointly primary shaping by means of (simultaneous) primary shaping, and, in one embodiment, by means of forward-backward cup extrusion or else by a plurality of stamps acting simultaneously on a semifinished product.

In this way, in one embodiment, it is possible to produce an advantageous, in particular (more) stable and/or (more) rigid housing and/or to improve (further) the impact contact characteristic.

In one embodiment, the housing is or will be produced from bar material.

In this way, in one embodiment, it is possible to produce an advantageous, in particular (more) stable and/or (more) rigid housing and/or to improve (further) the impact contact characteristic.

In one embodiment, the first cavity and/or the additional cavity is or are cylindrical or cuboid in shape, in particular with rounded corners.

In one embodiment, it is thereby possible to improve (further) the impact contact characteristic.

BRIEF DESCRIPTION OF THE DRAWING FIGURES

Other advantageous enhancements of the present invention ensue from the dependent claims and the following description of preferred embodiments. Shown partially schematically for this purpose are:

FIG. 1 shows an impulse body module in accordance with an embodiment of the present invention in a section along a direction of impact;

FIG. 2 shows an impulse body module in accordance with another embodiment of the present invention in an illustration corresponding to FIG. 1;

FIG. 3 shows an impulse body module group in accordance with an embodiment of the present invention in an illustration corresponding to FIG. 1;

DESCRIPTION OF THE INVENTION

Figure 4:
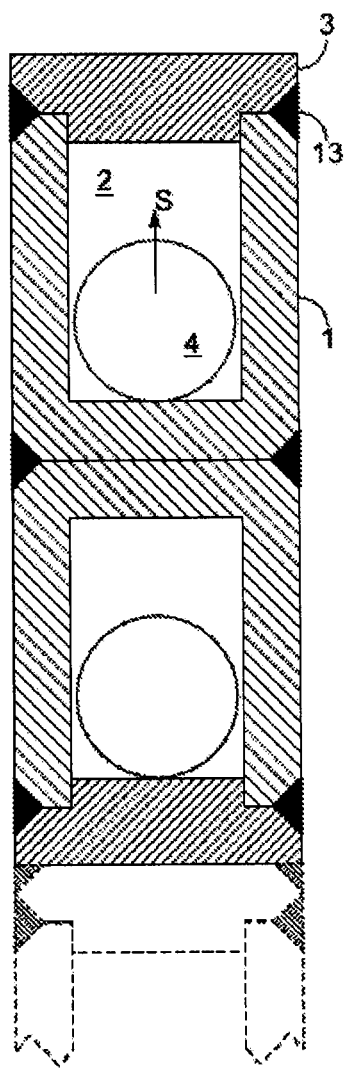
FIG. 4 shows an impulse body module group in accordance with another embodiment of the present invention in an illustration corresponding to FIG. 3.

FIG. 1 shows an impulse body module in accordance with an embodiment of the present invention in a section along a first direction of impact S.

The impulse body module has a one-piece housing 1 with a first, single cavity 2, which is closed in an airtight manner by a first cover 3, which is joined to the housing 1 in a material-bonded manner by way of a girth weld 13 and in which a first, single impulse body 4 is accommodated with play of movement in the first direction of impact S.

The housing is cylindrical in shape (whereby the long axis of the cylinder corresponds to the first direction of impact S) or cuboid in shape and correspondingly has a plurality of symmetry planes.

The first cover 3 is centered at the housing 1 in a form-fitting manner by means of a collar, which engages in the cavity 2.

FIG. 2 shows, in an illustration corresponding to FIG. 1, an impulse body module in accordance with another embodiment of the present invention. Features that correspond to one another are identified by identical reference numbers, so that reference is made to the preceding description and only differences are addressed below.

In the embodiment of FIG. 2, the housing has a single additional cavity 20, in which a single additional impulse body 40 is accommodated with play of movement in the first direction of impact S and which is closed in an airtight manner by an additional cover 30, which lies opposite the first cover 3 and is joined to the housing 1 by another girth weld 13 in a material-bonded manner.

The two cavities 2, 20 are or will undergo primary shaping by forward-backward cup extrusion and, in an alternative embodiment, by a machining or material removal method.

FIG. 3 shows an impulse body module group in accordance with an embodiment of the present invention in an illustration corresponding to FIG. 1. Features that correspond to one another are further identified by identical reference numbers, so that reference is made to the preceding description.

The impulse body module group of FIG. 3 is composed of two of the impulse body modules, as were explained above with reference to FIG. 1. They are or will be arranged next to one another transverse to the first direction of impact and joined together by a band clamp 5.

As indicated in FIG. 3 in dashes, an impulse body module group can also have additional impulse body modules, which, in particular, are identical in construction. In particular, the impulse body module group of FIG. 3, which is composed of two or more impulse body modules, can be a first impulse body module group, and a second impulse body module group that is identical in construction to the first group can have a number of identical impulse body modules that differs therefrom. These different impulse body module groups can be used to equip different gas turbine blades.

FIG. 4 shows, in an illustration corresponding to FIG. 3, an impulse body module group in accordance with another embodiment of the present invention. Features that correspond to one another are identified by identical reference numbers, so that reference is made to the preceding description and only differences are addressed below.

In the embodiment of FIG. 4, two or—as indicated once again in dashes—more of the impulse body modules, as explained above with reference to FIG. 1, are or will be arranged one above the other in the first direction of impact and joined to one another by welding, soldering, adhesive bonding, clamping, or the like to form the impulse body module group.

Figure 5:
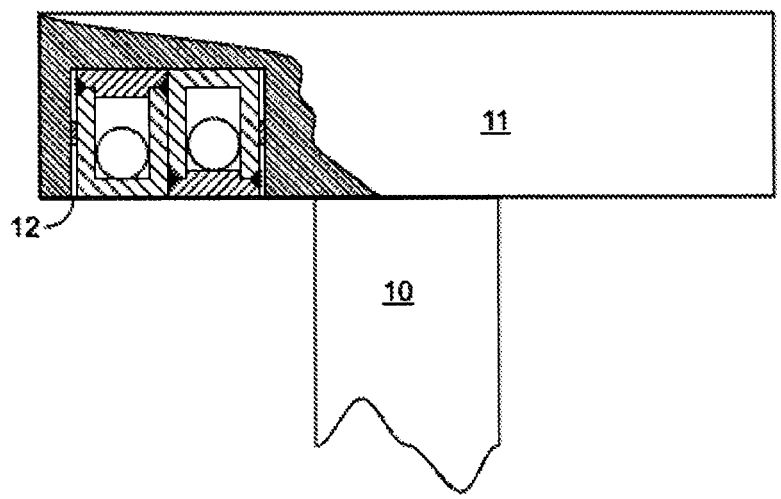
FIG. 5 shows a gas turbine blade with an impulse body module group in accordance with an embodiment of the present invention in a partial section.

FIG. 5 shows a gas turbine blade 10 with an impulse body module group in accordance with an embodiment of the present invention in a partial section.

This impulse body module group corresponds in principle to the embodiments in accordance with FIG. 3, whereby, however, the two impulse body modules are rotated by 180° with respect to each other in order to illustrate the diversity of variants that can be realized.

The impulse body module group is arranged in a cavity 12 of an outer shroud 11 of the gas turbine blade 10 and is fastened in it in a friction-fitting manner by the band clamp 5, which thus advantageously fulfills a dual function and simultaneously serves as a spring element fastening the impulse body module group to the gas turbine blade.

Figure 6:
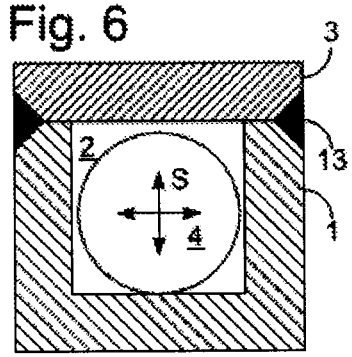
FIG. 6 shows an impulse body module in accordance with another embodiment of the present invention in an illustration corresponding to FIG. 1.

FIG. 6 shows, in an illustration corresponding to FIG. 1, an impulse body module in accordance with another embodiment of the present invention. Features that correspond to one another are identified by identical reference numbers, so that reference is made to the preceding description and only differences are addressed below.

In the embodiment of FIG. 6, the cavity 2 is cube-shaped with rounded or chamfered edges or inner contours, whereby one of the three symmetry planes defines the first direction of impact.

The cover 3 rests flat on housing 1 or without form fit.

Figure 7:
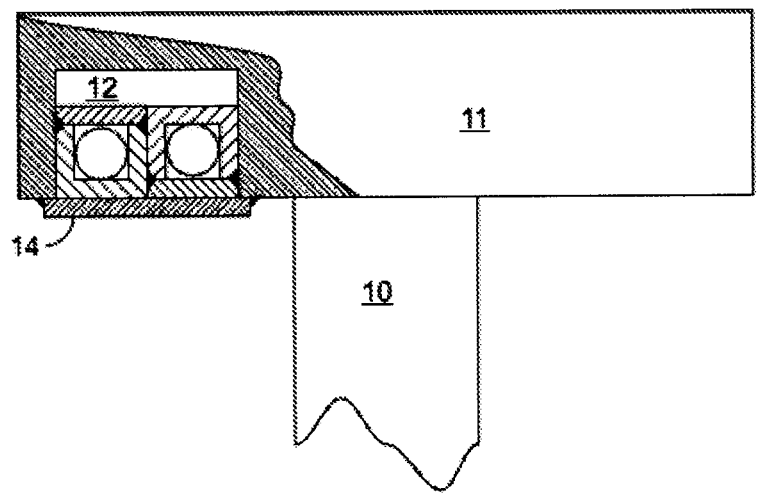
FIG. 7 shows a gas turbine blade with an impulse body module group in accordance with another embodiment of the present invention in an illustration corresponding to FIG. 5.

FIG. 7 shows, in an illustration corresponding to FIG. 5, a gas turbine blade with an impulse body module group in accordance with another embodiment of the present invention. Features that correspond to one another are identified by identical reference numbers, so that reference is made to the preceding description and only differences are addressed below.

In the embodiment of FIG. 7, the cavity 12 is closed by a sealing cover 14, which is welded, soldered, or adhesively bonded to the gas turbine blade.

Figure 8:
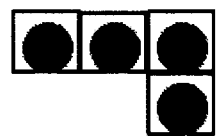
FIGS. 8a, 8b and 8c show impulse body module groups with various shapes in accordance with another embodiment of the present invention.
Figure 8:
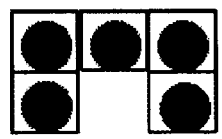
Figure 8:
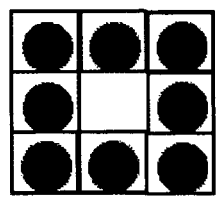

FIGS. 8a, 8b and 8c show three different embodiments of an impulse body module group, namely in an L shape (FIG. 8a)), in a C shape (FIG. 8b)), and in a square ring shape (FIG. 8c)).

Even though exemplary embodiments have been explained in the preceding description, it is noted that a large number of modifications are possible.

Thus, in particular, instead of the impulse body module of FIG. 1 in the embodiments of FIGS. 3-5, the impulse body module of FIG. 2 can also be used in each case.

Additionally or alternatively, in particular, the cavities can be designed to be cube-shaped in each case, in particular with rounded or chamfered edges or inner contours, as shown and explained with reference to FIGS. 6, 7.

Additionally or alternatively, in the embodiment of FIG. 6, the sealing cover 14 of FIG. 7 can also be provided.

In particular, the overall view of FIGS. 3-5, 7, and 8a, 8b and 8c illustrates the diversity of variants that can be used or can be made available by joining impulse body modules according to the invention to form impulse body module groups according to the invention, in particular by joining different numbers of impulse body modules according to the invention to form different impulse body module groups according to the invention, while, at the same time, affording a low(er) production cost for equipping different gas turbine blades.

Moreover, it is noted that what is involved in the exemplary embodiments are merely examples, which are not intended to limit the protective scope, the applications, and the structure in any way. Instead, the preceding description affords the person skilled in the art a guideline for implementing at least one exemplary embodiment, whereby diverse changes, in particular in regard to the function and arrangement of the described component parts, can be made without leaving the protective scope as ensues from the claims and the combinations of features equivalent to these claims.

What is claimed is:

1. An impulse body module group with at least two impulse body modules, which are identical in construction, for a gas turbine blade, wherein each of the impulse body modules comprises
    a housing, which is of one piece and which has a cavity, which is closed in an airtight manner, by a cover, which is joined to the housing in a material-bonded manner, and in which a single spherical or cylindrical impulse body is accommodated with play of movement in at least one first direction of impact,
    wherein the housing of each of the impulse body modules has no additional cavity and has no additional spherical or cylindrical impulse body accommodated with play of movement in at least one direction of impact, and
    wherein at least two impulse body modules are joined together in a non-destructive detachable manner, in a permanent manner, in a friction-fitting manner, in a form-fitting manner, in a material-bonded manner, by at least one clamping element, are arranged one above the other in the first direction of impact or are arranged next to one another transverse to the first direction of impact.

2. The impulse body module group according to claim 1, wherein the at least two impulse body modules are a first impulse body module, having a first cover, and a second impulse body module, having a second cover; the first cover and the second cover being located on opposite sides of the impulse body module group relative to each other.

3. The impulse body module group according to claim 1, wherein the housing and/or the cavity have at least one plane of symmetry and is cylindrical or cuboid in shape.

4. The impulse body module group according to claim 1, wherein the cover is centered at the housing in a form-fitting manner or rests or rest flat on the housing.

5. The impulse body module group according to claim 1, wherein a selected wall thickness of the cavity of the housing varies by at most 25% relative to any wall thickness of the cavity of the housing or the wall thickness of the cavity of the housing is at least 1% and at most 50% of a diameter of the impulse body accommodated in it.

6. The impulse body module group according to claim 1, wherein a play of movement of the impulse body in the respective direction of impact in the cavity in which it is accommodated is at least 1% and/or at most 500% of its diameter, and/or at least two times and/or at most one-hundred times a play of movement in a guiding direction transverse to this direction of impact.

7. The impulse body module group according to claim 1, wherein the impulse body modules are arranged in an L shape, in a C shape, in a ring shape, a rectangular and/or square ring shape, or in a shape that is formed from two or more suchlike shapes.

8. The impulse body module group according to claim 1, wherein the impulse body module group comprises at least one first impulse body module group and at least one second impulse body module group, the at least one first impulse body module group and the at least one second impulse body module group are configured as an assembly, wherein the at least one first impulse body module group and the at least one second impulse body module group have different numbers of impulse body modules each of which are identical in construction.

9. The impulse body module group according to claim 1, wherein the impulse body module group is configured in a gas turbine blade and arranged at an outer or inner shroud.

10. The impulse body module group according to claim 1, wherein the impulse body module group is arranged in a cavity of the gas turbine blade and/or is fastened in a friction-fitting manner, in a form-fitting manner, and/or in a material-bonded manner, and/or by the at least one clamping element.

11. The impulse body module group according to claim 1, wherein the impulse body module group is configured and arranged in an assembly for reducing vibrations of a plurality of gas turbine blades.

12. The impulse body module group according to claim 1, wherein
the cavity of each of the impulse body modules is produced by machining, electrical material removal, primary shaping, or extrusion; and
the housing is produced from bar material,
wherein the impulse body module group, is arranged in a cavity of the gas turbine blade.

* * * * *